United States Patent [19]

Pohjakallio

[11] Patent Number: 5,502,721
[45] Date of Patent: Mar. 26, 1996

[54] PACKET DATA TRANSFER IN A CELLULAR RADIO SYSTEM

[75] Inventor: Pekka Pohjakallio, Espoo, Finland

[73] Assignee: Nokia Telecommunications Oy, Espoo, Finland

[21] Appl. No.: 211,746
[22] PCT Filed: Aug. 13, 1993
[86] PCT No.: PCT/FI93/00319
§ 371 Date: Apr. 14, 1994
§ 102(e) Date: Apr. 14, 1994
[87] PCT Pub. No.: WO94/05094
PCT Pub. Date: Mar. 3, 1994

[30] Foreign Application Priority Data

Aug. 14, 1992 [FI] Finland ................................ 923667

[51] Int. Cl.$^6$ ................................ H04J 3/16; H04B 1/00
[52] U.S. Cl. ................ 370/60.1; 370/95.1; 370/95.3; 370/110.1; 455/54.2; 455/57.1; 379/63
[58] Field of Search ................ 370/95.3, 95.1, 370/95.2, 99, 105.2, 110.1, 32, 29, 24, 60, 60.1, 68.1, 85.7, 94.1, 85.8, 94.2; 455/54.1, 54.2, 56.1, 33.1, 34.1, 53.1, 57.1, 67.1, 68, 89, 95, 105; 340/825.03; 379/57, 58, 63

[56] References Cited

U.S. PATENT DOCUMENTS

| 4,472,802 | 9/1984 | Didier et al. | 370/104 |
| 4,887,265 | 12/1989 | Felix | 370/94.1 |
| 5,260,700 | 11/1993 | Merchant et al. | 455/54.1 |
| 5,303,234 | 4/1994 | Kou | 370/95.3 |
| 5,377,192 | 12/1994 | Goodings et al. | 370/95.3 |

FOREIGN PATENT DOCUMENTS

| 2282198 | 9/1988 | European Pat. Off. . | |
| 2332818 | 9/1989 | European Pat. Off. . | |
| 0332825 | 9/1989 | European Pat. Off. | H04Q 7/04 |
| 0333679 | 9/1989 | European Pat. Off. | H04B 7/26 |
| 2522636 | 1/1993 | European Pat. Off. . | |

Primary Examiner—Alpus Hsu
Assistant Examiner—Ricky Q. Ngo
Attorney, Agent, or Firm—Cushman Darby & Cushman

[57] ABSTRACT

Packet data transfer in a digital cellular radio system including at least one common organization channel for sending pages, connection requests, and channel assignments so as to establish an actual connection on another channel. User data is transferred from the mobile stations to the base station interleaved with the connection request messages on at least one random-access-type organization channel in messages which will not result in a normal connection establishment. The mobile station sends a random-access-type packet data transfer request on the random-access-type organization channel. A timing advance corresponding to the distance between the base station and the mobile station is determined on the basis of the request received at the base station. The mobile station then utilizes the timing advance for sending data packets on the random-access-type organization channel in messages longer than the transfer request by timing the transfer of the messages with respect to the operation of the base station.

13 Claims, 5 Drawing Sheets

BCCH + CCCH
BTS → MS

FIG. 2A

| F | S | B | | C | F | S | C | | C | F | S | C | | C | F | S | C | | C | F | S | C | | C |

BCCH + CCCH (RACH)
MS → BTS

FIG. 2B

| R | R | R | R | R | R | R | R | R | R | R | R | R | R | R | R | R | R | R | R | R | R | R | R | R | R | R | R | R | R | R | R | R | R | R | R | R | R | R | R | R | R | R | R | R | R | R | R | R | R | R |

←———————— 51 frames   235 ms ————————→

BCCH + CCCH + 4 SDCCH/4
BTS → MS

FIG. 2C

| F | S | B | | C | F | S | C | | C | F | S | D0 | D1 | F | S | D2 | D3 | F | S | A0 | A1 |
| F | S | B | | C | F | S | C | | C | F | S | D0 | D1 | F | S | D2 | D3 | F | S | A2 | A3 |

BCCH + CCCH + 4 SDCCH/4
MS → BTS

FIG. 2D

| D3 | R | R | A2 | A3 | R | R | R | R | R | R | R | R | R | R | R | R | R | R | R | R | R | R | R | D0 | D1 | R | R | D2 |
| D3 | R | R | A0 | A1 | R | R | R | R | R | R | R | R | R | R | R | R | R | R | R | R | R | R | R | D0 | D1 | R | R | D2 |

S = SCH
F = FCCH
B = BCCH
C = CCCH
R = RACH
D = SDCCH
A = SACCH/C

PACKET DATA TRANSFER IN A CELLULAR RADIO SYSTEM

FIELD OF THE INVENTION

The invention relates to packet data transfer in a cellular radio system.

BACKGROUND OF THE INVENTION

Advanced digital cellular systems typically offer a circuit-switched data channel for data applications. As is well-known, circuit-switched connections are very heavy to establish. In addition, at least one traffic channel of the system capacity has to be allocated to the circuit-switched connection until the connection is released. For these reasons, circuit-switched data connections are suitable mainly for applications which continuously require a transfer capacity of one transfer channel of the system for relatively long periods of time. Allocation of a circuit-switched channel for the transfer is a typical example of applications suitable for the system.

Many data applications involve a low, randomly occurring transfer demand and a need to keep the (virtual) transfer connection open continuously. A circuit-switched connection is not suitable for such purposes as the resources of the cellular system are reserved unreasonably, and the implementation of a service would therefore become too expensive.

Advanced digital cellular systems also comprise a short message service. A short message may be used in data services for the transfer of small amounts of data. In the GSM system, for instance, sending a short message is similar to a conventional call set-up procedure, i.e., it is a very heavy signalling event. The applicability of short messages in the establishment of economical data connections is therefore limited.

There are prior art packet-switched radio systems implemented for data applications. Such systems require separate network investments for data connections. As the modern cellular systems as such comprise functions useful for data applications, it is advantageous to aim at utilizing these functions in providing economical data connections.

SUMMARY OF THE INVENTION

An object of the present invention is to solve the above-described problem by providing a new packet transfer solution which is adapted for a digital cellular system and which offers data connections considerably more economical than the prior art cellular network services.

One concept of the invention is a method for the transfer of user data in packet format in a digital cellular radio system comprising base stations for communication with mobile radio stations, each one of the base stations comprising at least one organization channel shared by all of the mobile radio stations for sending pages from the base station to the mobile stations, for sending connection requests from the mobile stations to the base station, and for sending channel assignments to the mobile stations so as to establish an actual connection on another channel. The method according to the invention is characterized by transferring the user data from the mobile stations to the base station interleaved with the connection request messages on at least one random-access-type organization channel in messages which will not result in a normal connection establishment; sending a random-access-type packet data transfer request on the random-access-type organization channel from the mobile station to the base station; detecting the time of sending the random-access-type transfer request on the basis of the request received at the base station; determining a timing advance corresponding to the distance between the base station and the mobile station on the basis of the detected time; sending the determined timing advance information to the mobile station; sending data packets on the random-access-type organization channel from the mobile station to the base station in messages longer than said transfer request and timing the transfer of the messages with respect to the operation of the base station by means of the timing advance.

Another concept of the invention is a mobile station for a digital cellular radio system comprising base stations for communication with mobile radio stations, each one of the base stations comprising at least one organization channel shared by all of the mobile radio stations for sending pages from the base station to the mobile stations, for sending connection requests from the mobile stations to the base station, and for sending channel assignments to the mobile stations so as to establish an actual connection on another channel. The mobile station according to the invention is characterized in that the mobile station comprises means for sending a random-access-type packet data transfer request on a random-access-type organization channel; means for receiving a timing advance corresponding to the distance between the mobile station and the base station from the base station so as to receive such timing advance information; means for transferring user data in packet format to the base station interleaved with connection request messages on at least one random-access-type organization channel in messages which are longer than the transfer request and will not result in a normal connection establishment by timing the transmission of the messages with respect to the operation of the base station by means of the timing advance information.

In the cellular radio system, the fixed network typically sends via the base station a connection establishment request provided with the identity of the mobile station on a special organization channel (also called a control channel) when a connection is to be established with a mobile station. The establishment of an actual speech or data connection is then attempted. Correspondingly, when a mobile station wants to establish a connection, it sends a connection establishment request on one of the organization channels of the cellular radio system, as a result of which the system allocates the mobile station a dedicated call-specific channel on which actual signalling takes place. All mobile stations within a specific base station site (cell) use and listen to the same common organization channel(s). Organization channels are never allocated as circuit-switched connections as only control signalling required to establish a circuit-switched connection takes place on the organization channels.

The transfer of user data in packet format, when practicing the invention, is based on existing connection establishment procedures, which are applied on the organization channel(s) reserved for the connection establishment requests of the cellular radio system. Data transfer thus needs no circuit-switched connection but the data to be transferred is interleaved with the standard messages.

Organization channels from a mobile station towards the system are usually so-called random access channels. A problem with data transfer on a random access channel is that the mobile station is able to send a random access message at any time within a time slot allocated for the organization channel. For this reason the random access messages have to be very short in order to ensure that they match one time slot. A random access message is thus usually too short even for small amounts of data.

According to the present invention, a solution to the problem is that only a data transfer request sent by the mobile station is of the pure random access type with unknown timing. On the basis of this random access message, the system determines a timing advance depending on the distance between the base station and the mobile station. The timing advance then enables the mobile station to time the transmission of the burst to the beginning of the random access time slot and thereby utilize bursts having the length of the entire random access time slot in the subsequent transfer instead of short random access bursts. In this way, the amount of data transferred on the random access channel will meet the practical requirements.

In the cellular network, the packet transfer according to the invention is transparent to mobile stations which do not use the packet transfer, that is, the cellular network operates otherwise as normal, but the data transfer on the organization channels provides a new way of data transfer in parallel with the previous functions. Unlike the "circuit-switched" connection, the organization channel is not allocated to the data transfer of a specific mobile station, but several mobile stations may transfer data simultaneously on the channel. Besides, all normal connection establishment signalling also takes place on the same organization channels.

The packet transfer from mobile stations to the base station (up-link transfer) is observed by other mobile stations as an increase in the connection request collision intensity. This in turn increases the need of re-transmission of connection requests. In an overload situation, no connection requests of the mobile stations will pass through and therefore will not be acknowledged. The number of connection request attempts allowed to mobile stations is typically limited in the cellular systems.

To ensure that the cellular system operates without interferences, the up-link packet transfer should not be allowed to load the above critical resource. Therefore, in one embodiment of the invention, the system is able to control the degree of load of the organization channels by allowing only a predetermined number of mobile stations to transfer data simultaneously. This is achieved by providing a packet transfer protocol by which the mobile station has to request from the fixed network an authorization for a transfer intensity exceeding a preset limit. To facilitate the load control, the authorization is preferably valid for a limited time.

Packet transfer may also take place from the base station to the mobile stations (down-link transfer), whereby the packets are interleaved with the ordinary control messages on the organization channel. This packet transfer is transparent to mobile stations which do not use the packet transfer as they follow only pages addressed to them. From the viewpoint of the system, this means that the organization channel is loaded and there may not be capacity enough for control signalling itself, which results in queuing or rejection of pages. This can be avoided easily by giving priority to the control signalling over the packet transfer in the down-link traffic.

To sum up, the present invention enables ordinary mobile stations within a cellular system to be provided with an additional packet transfer function realized on the organization channel of the cellular system by interleaving the data packets with the ordinary connection requests sent on the organization channel. The packet transfer according to the invention is non-transparent to the other mobile stations only in that the connection request collision intensity increases with the degree of load of the system. In other words, the same cellular system may support both mobile stations using the packet transfer according to the invention and mobile stations which are not aware of the packet transfer according to the invention. The packet transfer according to the invention can thus be added to a cellular network providing services without interfering with the operation of the existing mobile stations. The packet transfer according to the invention takes place on the organization channel so that the mobile station remains continuously accessible to the conventional cellular network services while it is all the time ready to receive packet data. The invention utilizes the conventional mobility management of the cellular network by sending packets addressed to the mobile stations only within the current location area of the addressed mobile station. The precise routing of the connections makes the use of the system more efficient (increases capacity).

BRIEF DESCRIPTION OF THE DRAWINGS

The invention will be described in greater detail by means of illustrating embodiments with reference to the attached drawings, in which

FIGS. 2A, 2B, 2C and 2D illustrate TDMA channel organization in different superframe configurations of 51 TDMA frames in the GSM system;

DETAILED DESCRIPTION OF THE INVENTION

The method according to the present invention is applicable on the control channels of the digital TDMA (Time Division Multiple Access) cellular radio systems. The method is particularly advantageous when applied in the Pan-European digital mobile radio system GSM and other similar digital systems, such as DCS1800 and PCN (Personal Communication Network). In the following the preferred embodiment of the invention will be described as an application in the GSM system, to which the invention, however, is not limited.

Figure 1:
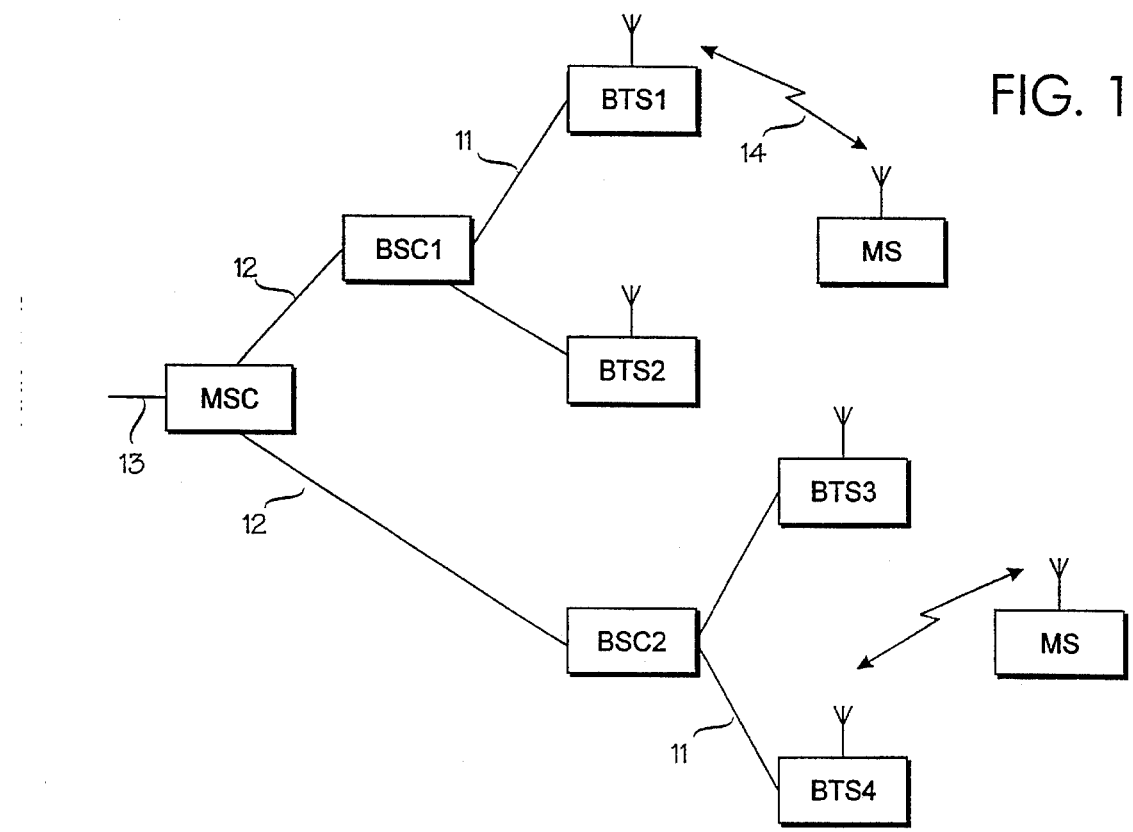
FIG. 1 illustrates schematically a portion of a cellular radio system in which the method according to the invention is applied.

FIG. 1 shows schematically a portion of a GSM cellular radio system. In the cellular radio system the area covered by the system is divided into radio cells. Two base station controllers BSC1 and BSC2 are connected by digital transmission links 12 to a mobile exchange MSC. Furthermore, base stations BTS1, BTS2 and BTS3, BTS4 are connected by digital transmission links 11 to the base station controllers BSC1 and BSC2, respectively. Each BSC and the base stations controlled by it form a base station system BSS. The radio coverage area of a single base station BTS typically forms a single radio cell. Each base station BTS1 to BTS4 has a predetermined fixed number of physical radio channels. The configuration and properties of the GSM system are described in greater detail in the GSM specifications, which are hereby incorporated by reference. Only a few features essential to the invention will be described below.

In the TDMA (Time Division Multiple Access) systems a signal (physical channel) consists of TDMA frames each comprising a number of time slots (eight time slots in GSM) in which logical channels are transferred. Logical channels comprise traffic channels for calls to be set up with mobile radio stations MS residing in the cell, and control channels for signalling with mobile radio stations MS residing in the cell. In the GSM system, one superframe comprises 51 or 26 TDMA frames. FIGS. 2A, 2B, 2C and 2D illustrate different kinds of control channel superframes used over the radio path in the transmission direction (downlink) from the base station BTS to the mobile radio station MS (such as a mobile telephone), FIGS 2C and 2D and in the reverse direction (uplink) from the mobile radio station MS to the base station BTS, FIGS 2C and 2D.

Logical channels essential for the invention include Common Control Channels CCCH. In the paging, the fixed network pages a mobile station MS in order to alarm the MS to contact the network. To this end, the MSC commands the base station system BSS to send a page on a Paging channel PCH, which is one of the CCCH channels. When the mobile station MS receives a page or wants to initiate a call, it sends a connection request on a Random Access Channel RACH, which is also one of the CCCH channels. In response to the connection request, the base station system BSS sends a channel assignment on an Access Grant Channel AGCH.

Figure 3:
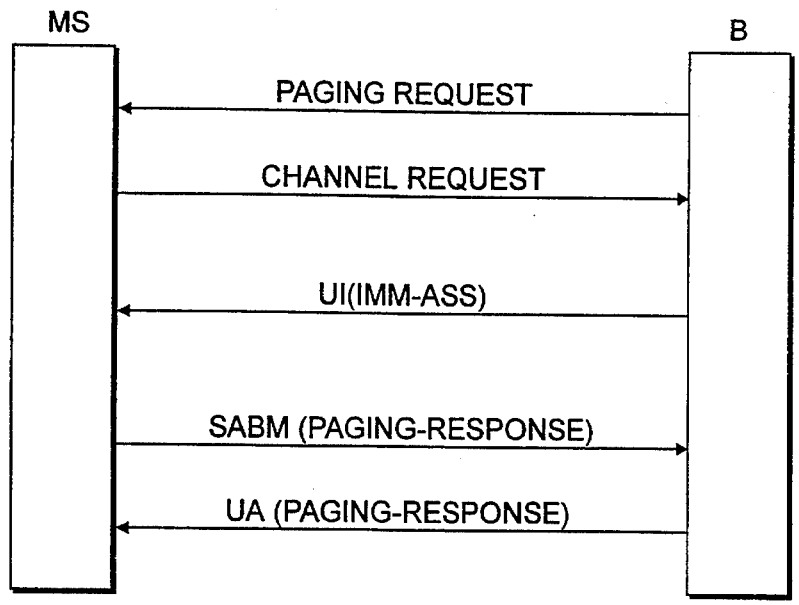
FIG. 3 is a signalling diagram illustrating a normal connection establishment procedure in the GSM system.

FIG. 3 illustrates messages transferred over the radio path when the base station system BSS pages a mobile subscriber station MS. The BSS pages the mobile station MS by sending a Paging Request message on the PCH. On receiving the paging request, the mobile station MS requests a signalling channel by sending a Channel Request message on the RACH. Upon receiving the Channel Request message, the base station system BSS, which is not aware that the current connection request is associated with the previously transmitted Paging Request message, allocates a signalling channel (SDCCH) for the mobile station MS by sending an Immediate Assignment message on the AGCH. When the SDCCH is allocated to the mobile station MS, the mobile station transmits on this channel a Paging Response message, which is forwarded to a VLR controlling the paging procedure. On the basis of this message, the VLR establishes a radio connection and then transfers the call control to the MSC.

From the Channel Request message onward, the connection set-up initiated by the mobile station MS is such as shown, the only difference being that the MS sends a page without the impulse given by the Paging Request message. The BSS is not able to distinguish between Channel Request messages sent for different reasons but always responds to them in the same way.

In the present invention the broadcast nature of the above-described paging messages and the random access nature of the channel request messages are utilized by implementing a packet transfer solution in parallel therewith. The packet transfer according to the present invention does not require any call set-up and is compatible with the original service so that the mobile stations already existing in the cellular system will not be aware of this new facility. In other words, the invention embodies a substantially automatic user data transfer concept in which addressed data can be transferred in a single packet (TDMA time slot) without any related connection establishment.

The packet transfer according to the invention will be divided below into two cases: data transfer to the mobile station MS and data transfer from the mobile station.

MS terminating packet data transfer

Figure 4:
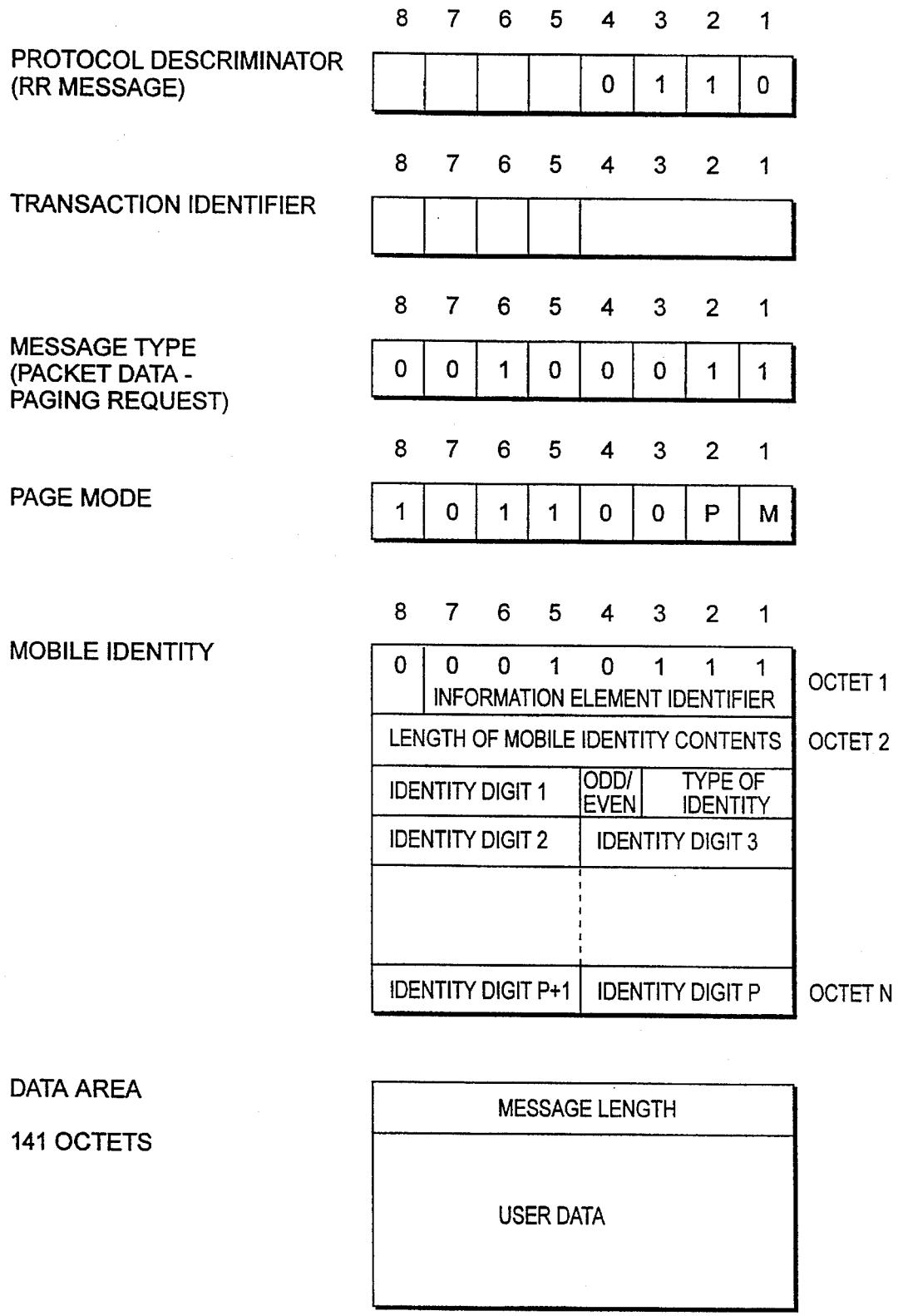
FIG. 4 illustrates a GSM Paging Request message modified for the data transfer according to the invention.

In the data transfer to the mobile station the base station system BSS sends a Packet Data Paging Request message, which is a new message reserved for the packet transfer on the PCH. The format of the message is shown in FIG. 4. The Packet Data Paging Request message is of the same type as the Paging Request message, from which it differs mainly in two respects:

1) The message type indicates that the message is dedicated to the packet data transfer. This is done by selecting a bit pattern 0010011 dedicated to control messages but currently unused to indicate data transfer in the control message.

2) The Packet Data Paging Request message comprises an extra field of 141 octets which is utilized to transfer user data. The first octet indicates the message length.

When the mobile station MS receives a data packet, it acknowledges the successful receipt by sending a Packet Data Channel Request message to the base station BTS on the RACH. The format of this message may be of the same type as that of a message to be described below in connection with FIG. 6 except that the Establish Cause field gets the value 011.

MS originating packet data transfer

The mobile radio station MS sends packet-format data on the RACH in PacketDataChannelRequest messages. The base station system BSS acknowledges the successful receipt of the Packet Data Channel Request message by sending a Packet Data Paging Request message on the PCH.

As the Timing of the random access burst, in which form both the Packet Data Channel Request and the Channel Request message are sent, is not known, only one octet of information can be transferred in the burst. This is not sufficient for data applications, and it is therefore necessary that a standard burst can be used for the packet data transfer. The transmission of such a normal burst is timed so that when the burst is received in the base station system BSS, it is synchronized with the TDMA frame. This requires that the base station system BSS is controlled similarly as in the standard connection establishment.

In the standard connection, establishment the base station detects the time of reception of the random access burst Channel Request. On the basis of the time of reception, the base station selects a timing advance to be addressed to the mobile station in an Immediate Assignment channel assignment so that any later signalling on the SDCCH may take place with a proper timing so that a normal burst can be used.

Figure 5:
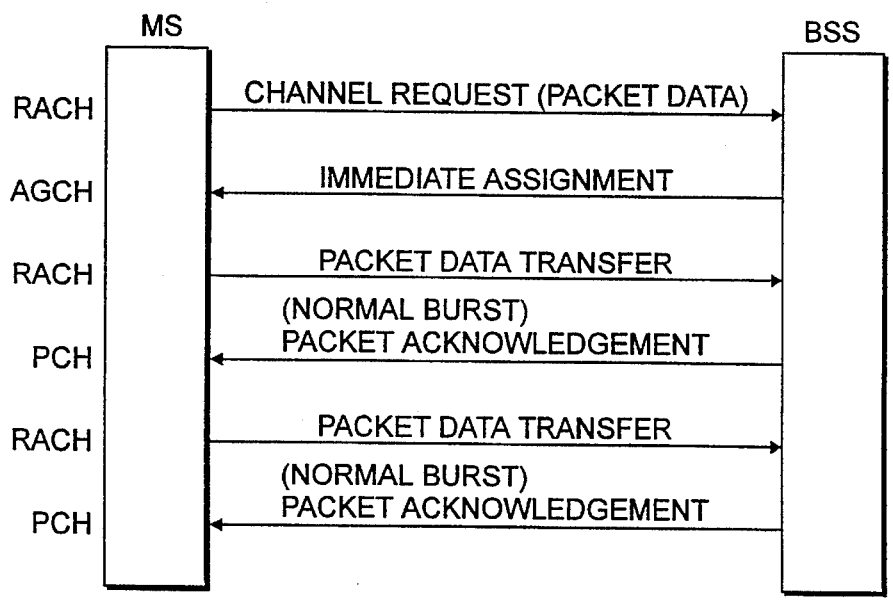
FIG. 5 is a signalling diagram illustrating packet data transfer according to the invention from a mobile station MS to a base station BTS.
Figure 6:
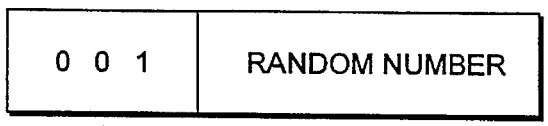
FIG. 6 illustrates a GSM Channel Request message modified into a message requesting the transfer of packet data according to the invention.

This feature of the base station of the TDMA-based digital cellular network is utilized in the invention as will be described below with reference to FIG. 5. The mobile station MS which wants to transmit packet data sends a Packet Data Channel Request message, which indicates the packet transfer requested. The Channel Request message may be a conventional random access burst, in which, e.g., an ESTABL.CAUSE field is used to distinguish a burst requesting a packet transfer from a random access burst requesting a standard connection establishment. The ESTABL.CAUSE field may be, e.g., such as shown in FIG. 6, where the first three bits are "001" and the remaining bits consist of a standard random number included in the burst.

Figure 7:
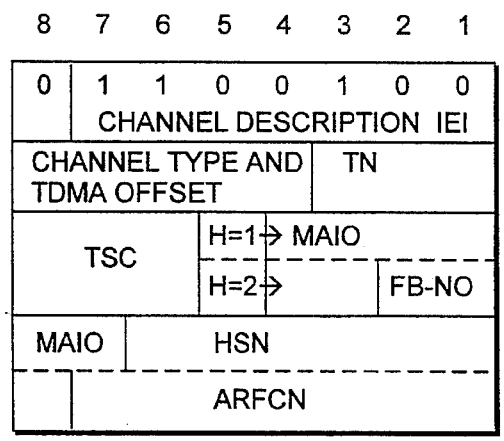
FIG. 7 illustrates a Channel Description information element in a GSM Immediate Assignment message modified for use as a packet acknowledgment message according to the invention.

When the fixed network (BSS) receives a packet data transfer request from the mobile station MS, it will not assign a dedicated SDCCH to the mobile station MS like in a standard case shown in FIG. 3. Instead, the base station system BSS detects the timing of the Packet Data Channel Request burst received on the RACH; determines the correct timing on the basis thereof; and grants access for the packet transfer by sending the Packet Data Immediate Assignment message on the AGCH if allowed by the traffic load of the control channel or the system. The Packet Data Immediate Assignment message, in which the base station system BSS sends a grant for a packet data transfer the mobile station MS, may be e.g., an Immediate Assignment message, the message type field of which (cf. FIG. 4) is set to a value "00111101" to indicate the transfer of packet data. As the message does not command the mobile station MS to the SDCCH as normal, but the data transfer takes place on the RACH, the channel type field of the channel information element shown in FIG. 7 is set, e.g., to a value "10001" to indicate that the MS should subsequently stay on the RACH. In addition, the message contains at least timing advance information which will be utilized by the mobile station MS in the subsequent transmission transactions on the RACH for synchronization with the operation of the base station. Due to the correct timing advance, the mobile station will subsequently be able to use a normal burst for the packet transfer on the RACH. The normal burst is longer than the random access burst and it has more capacity for user data. Such normal bursts are called Packet Data messages. Their structure will be described below in connection with FIG. 8. The Packet Data Immediate Assignment message may also contain a limited authorization to load the system by packet transfer. The limited authorization (transmission grant) may be, e.g., for a predetermined period of time and/or it may limit the number of packets to be transferred in a time unit.

Figure 8:
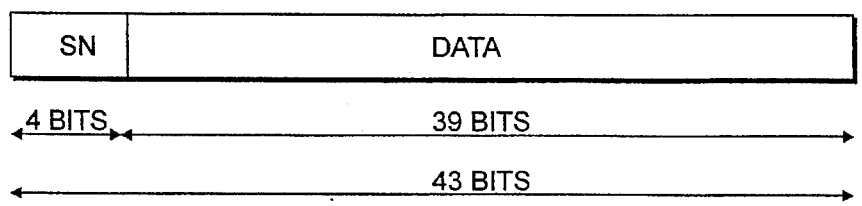
FIG. 8 illustrates a message according to the invention used in the packet transfer.

FIG. 8 illustrates a Packet Data burst (a so-called normal burst) which can be used with timing advance for the packet data transfer according to the invention on the random access channel RACH. The burst comprises at least a data field DATA and an address field SN. As there may be several mobile stations MS transmitting data simultaneously on the RACH, the network is able to distinguish between the data packets belonging to the deliveries of different mobile stations by means of the address field. The address field is preferably short in relation to the data field. However, the standard addresses used in the cellular radio system and other telecommunication systems are very long so that it is uneconomical to transfer the address of the receiving party (the destination address) in each message if the transfer capacity of the system is to be utilized for the transfer of user data. In the GSM system, a normal burst to be transferred on the RACH may be even too short for the transfer of address information in addition to user data.

In one embodiment of the invention, the fixed network allocates the MS a service number SN which identifies the transmitting MS. At the same time, the fixed network starts a timer 1 which is used to assign a specific service number to a specific MS for a predetermined period of time (a validity period). After the expiry of the time set for the timer the fixed network can allocate the same service number SN to another mobile station MS.

The use of the service number is described more closely in the Applicant's FI Patent Application 923668 Method for the transfer of packet data (having the same filing date as the above identified finnish application on which is based the claim for priority herein), which is hereby incorporated by reference.

The network preferably responds to the reception of each packet by sending a Packet Data Paging Request message as an acknowledgement message on the PCH to the mobile station MS. The format of the packet acknowledgement message may be nearly identical to that of the message described in connection with FIG. 4. The message type, for instance, may be changed to a value 00100110 and the length of the data area is reduced to 39 bits.

Figure 9:
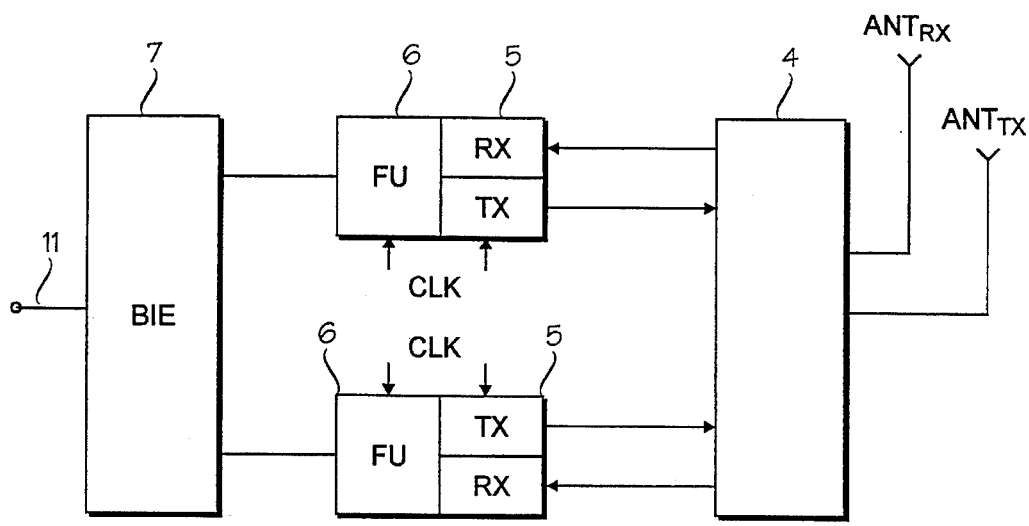
FIG. 9 shows a base station configuration.

FIG. 9 shows a specific base station BTS. The BTS comprises a baseband interface equipment 7 which interfaces the base station to the digital PCM link 11 from the base station controller BSC. Some of the PCM channels of the link 11 are reserved for control channels and some of them for traffic channels. A digital signal received from each one of the PCM channels (speech, data, control messages) is inserted in TDMA frames in a frame unit 6, channel-coded, interleaved and transmitted as TDMA bursts and modulated in a transceiver unit 5 to a desired transmission carrier and applied via a transmitter filter 4 to a transmitting antenna $ANT_{TX}$. Correspondingly, a TDMA signal received at a receiving antenna $ANT^{RX}$ is applied via receiver filters 4 to the transceiver unit 5, where it is modulated from the receiving carrier to the baseband. The signal is then detected, de-interleaved and channel-decoded, and the frames are disassembled in the frame unit 6. The received messages are then applied via the interface 7 to the PCM link 11. All messages to be sent are assembled in the base station controller BSC and sent via the base station BTS over the radio path. In the same way, the base station BTS forwards all messages received from the radio path to the base station controller BSC, where they are disassembled. At simplest, the implementation of the invention requires only the software of the BSC, which, in addition to the normal control messages, also assembles, disassembles and processes messages used in the transfer of packet data. Inbound and outbound packet data may further be transmitted between the BSC and MSC (and the rest of the network) in suitable messages or on a channel allocated for the purpose. However, this is not essential to the invention and will not be described more closely herein.

Figure 10:
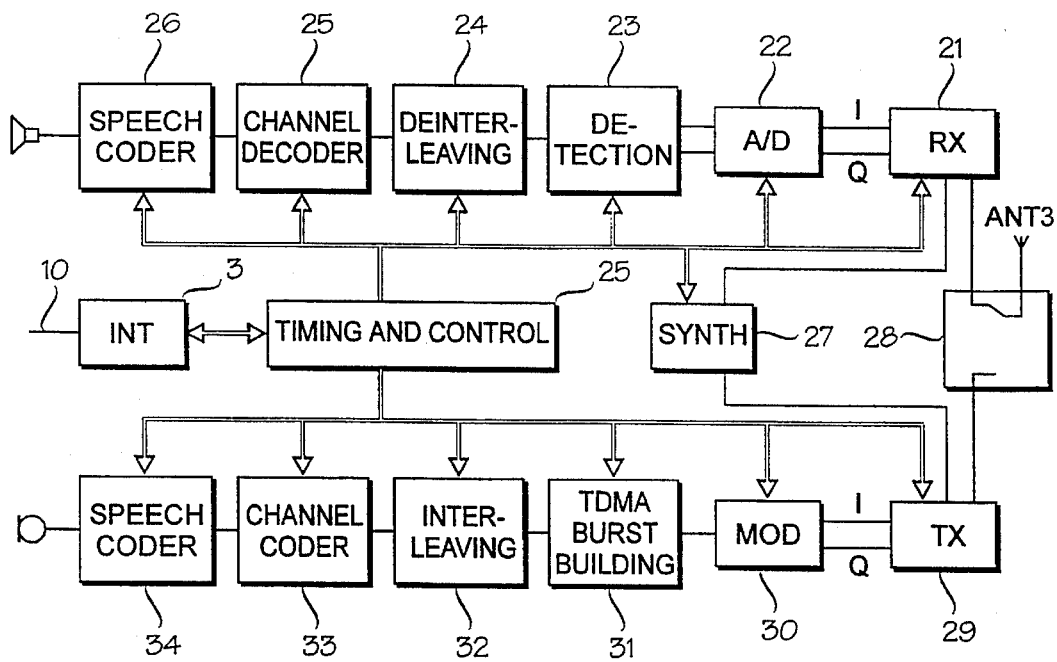
FIG. 10 shows a mobile station configuration.

FIG. 10 shows a mobile radio station MS suitable for use in the invention. The MS comprises an antenna 3, a duplex filter 28, a receiver 21, a transmitter 29 and a synthesizer 27. In the receiving direction, an A/D converter 22, a detector 23, a de-interleaving means 24, a channel decoder 25 and a speech coder 26 and a loudspeaker are connected in series with the receiver 21. In the transmitting direction, a modulator 30, a TDMA burst building means 31, an interleaving means 32, a channel coder 33, a speech coder 34 and a microphone are connected in series in front of the transmitter. The speech coder 34, the microphone, the speech decoder 26 and the loudspeaker are not essential to the invention. All the above-mentioned blocks are controlled by a timing and control unit 35 which processes all outbound and inbound messages. At simplest, the implementation of the invention requires that the unit comprises a software which, in addition to the normal control messages, also assembles, disassembles and processes messages used in the transfer of packet data. The destination and source of the inbound and outbound packet, respectively, may be, e.g., a keyboard, a display or an external data terminal. This, however, is not essential to the invention and will not be described more closely herein.

The figures and the description related to them are only intended to illustrate the present invention. Details of the method according to the invention may vary within the scope of the attached claims.

I claim:

1. Method for the transfer of user data in packet format in a digital cellular radio system comprising base stations and mobile radio stations, each one of the base stations comprising at least one organization channel shared by all of the mobile radio stations for sending pages from the respective base station to the mobile stations, for sending connection requests from the mobile stations to the respective base station, and for sending channel assignments to the mobile stations so as to establish an actual circuit-switched connection on another channel, comprising the steps of:

sending a random-access-type packet data transfer request on the random-access-type organization channel from one of said mobile stations to the respective base station, said packet data transfer request having a first duration;

detecting the time of sending the random-access-type transfer request on the basis of the packet data transfer request received at the respective base station;

determining a timing advance corresponding to the distance between the respective base station and said one mobile station on the basis of said detected time;

sending the determined timing advance information to said one mobile station;

transferring user data to the respective base station interleaved with the connection request messages from said one mobile station on said at least one random-access-type organization channel in data messages which will not result in a normal circuit-switched Connection establishment, said messages having a second duration which is longer than said first duration;

timing the transfer of the data messages with respect to the operation of the respective base station by means of the timing advance information.

2. Method according to claim 1, wherein:

said at least one organization channel of the respective base station comprises a first control channel for sending pages from the respective base station to said mobile stations;

a second control channel for sending connection request messages from said mobile stations to the respective base station; and a third control channel for sending acknowledgement messages from the respective base station to said mobile radio stations.

3. Method according to claim 2, wherein the transfer of packet data from said one mobile station to the respective base station comprises:

a) sending a message containing user data on the second control channel to the respective base station;

b) sending a response message as an acknowledgement on the third control channel to said one mobile station; and c) repeating steps a) and b) for each data packet to be transferred.

4. Method according to claim 3, wherein the transfer of packet data from said one mobile station to the respective base station comprises:

sending a packet data transfer request from said one mobile station to the respective base station on said second control channel;

allocating a service number identifying said one mobile station in response to the transfer request;

sending the service number in a response message from the respective base station to said one mobile station on said third control channel;

sending data packets containing user data and said service number from said one mobile station to the respective base station on said second control channel; and identifying data packets received from said one mobile station and routing the packets on the basis of said service number.

5. Method according to claim 1, further comprising:

interleaving the user data with the control messages.

6. Method according to claim 5, wherein the transfer of packet data from the respective base station to said one mobile radio station comprises:

a) sending a packet message containing user data on the first control channel to said one mobile radio station;

b) sending a response message as an acknowledgement on the second control channel to the respective base station; and c) repeating steps a) and b) for each data packet to be transferred.

7. Method according to claim 2, wherein the cellular radio system is a digital GSM mobile radio system; and that the first control channel is a Paging channel, the second control channel is a Random Access channel; and the third control channel is an Access Grant channel.

8. Mobile station for a digital cellular radio system comprising base stations for communication with mobile radio stations, each one of the base stations comprising at least one organization channel shared by all of the mobile radio stations for sending pages from the respective base station to the mobile stations, for sending connection requests from the mobile stations to the respective base station, and for sending channel assignments to the mobile stations so as to establish an actual circuit-switched connection on another channel wherein each said mobile station comprises:

means for sending a random-access-type packet data transfer request on a random-access-type organization channel, said data transfer request having a first length;

means for receiving a timing advance corresponding to the distance between the respective mobile station and the respective base station from the respective base station;

means for transferring user data in packet format interleaved with connection request messages to the respective base station on at least one random-access-type organization channel in data messages having a second length higher than said data transfer request and not resulting in a normal circuit-switched connection establishment; and means for timing the transmission of said data messages with respect to the operation of the respective base station by means of the timing advance information.

9. A data communication method in a digital cellular radio system comprising base stations and mobile radio stations, each one of the base stations having at least one organization channel shared by all of the mobile stations, for control signalling from the base stations to the mobile stations and for sending random-access connection request messages from mobile stations to the respective base station so as to establish a circuit-switched connection on another channel, comprising the steps of:

sending a random-access packet data transfer request message on said at least one organization channel by one said mobile radio station, which data request message will not result in a normal circuit-switched connection establishment and has a duration which is substantially shorter than a maximum allowed message duration;

receiving said data transfer request message at the respective base station;

determining a timing advance value corresponding to a distance between said one mobile station and the respective base station on the basis of the received data transfer request message;

sending the determined timing advance value to said one mobile station;

sending user data from said one mobile station to the respective base station on said at least one organization channel in data messages having a duration which is substantially equal to said maximum allowed message duration;

timing the sending of the data messages according to the determined timing advance value.

10. A data communication method in a digital cellular radio system comprising base stations and mobile radio stations, each one of the base stations having a first control channel for control signalling from the base stations to the mobile stations, and a second random-access control channel for sending random-access connection request messages from the mobile stations to the respective base station so as to establish a circuit-switched connection on another channel, comprising the steps of:

a) sending a random-access packet data transfer request message on said second random-access control channel by one said mobile radio station, which data transfer request message will not result in a normal circuit-switched connection establishment and has a duration which is substantially shorter than a maximum allowed message duration;

b) receiving said data transfer request message at the respective base station;

c) determining a timing advance value corresponding to a distance between said one mobile station and the respective base station on the basis of the received data transfer request message;

d) sending the determined timing advance value to said one mobile station on said first control channel;

e) sending user data from said one mobile station to the respective base station on said second random-access control channel in data message having a duration which is substantially equal to said maximum allowed message duration;

f) timing the sending of the data message according to the determined timing advance value;

g) receiving said data message at the respective base station;

h) sending an acknowledgement message to said one mobile radio station on said first control channel; and i) repeating steps e), f), g) and h) for each data packet to be transferred.

11. A digital cellular radio system comprising:

a plurality of mobile stations;

a plurality of base stations, each one of said base stations having at least one organization channel shared by all of said mobile stations, for control signalling from the base stations to the mobile stations for sending random-access connection request messages from the mobile stations to the respective base station so as to establish a circuit-switched connection on another channel;

at least one of the mobile stations being provided with a capability of sending a random-access packet data transfer request message on said at least one organization channel, which data transfer request message will not result in a normal circuit-switched connection establishment and has a duration which is substantially shorter than a maximum allowed message duration;

one of said base stations being responsive to the reception of said data transfer request message for determining a timing advance value corresponding to a distance between said at least one mobile station and said one base station on the basis of the received data transfer request message, and sending the determined timing advance value to said at least one mobile station;

said at least one mobile station being responsive to reception of said timing advance value for sending user data from the respective said mobile station to the respective said base station on said at least one organization channel in data messages having a duration which is substantially equal to said maximum allowed message duration, and timing the sending of the data messages according to the determined timing advance value.

12. A digital cellular radio system comprising:

mobile radio stations;

base stations, each one of the base stations having a first control channel for control signalling from the base stations to the mobile stations, and a second random-access control channel for sending random-access connection request messages from mobile stations to the respective said base station so as to establish a circuit-switched connection on another channel;

at least one of the mobile stations being provided with a capability of sending a random-access packet data transfer request message on said second random access control channel, said data transfer request message having a duration which is substantially shorter than a maximum allowed message duration;

the respective base station being responsive to reception of said data transfer request message for determining a timing advance value corresponding to a distance between said at least one mobile station and said respective base station on the basis of the received data transfer request message, and sending the determined timing advance value to said at least one mobile station on said first control channel;

said at least one mobile station being responsive to reception of said timing advance value for sending user data from the respective said mobile station to the respective said base station on said second random-access control channel in data message having a duration which is substantially equal to said maximum allowed message duration, and timing the sending of the data message according to the determined timing advance value;

the respective base station being responsive to reception of said data message for sending an acknowledgement message to the respective said mobile radio station on said first control channel.

13. A mobile station for a digital cellular radio system comprising base stations and mobile radio stations, each one of the base stations having a first control channel for control signalling from the base stations to the mobile stations, and a second random-access control channel for sending random-access connection request messages from mobile stations to the respective base station so as to establish a circuit-switched connection on another channel, said mobile station comprising:

a transmitter for sending a random-access packet data transfer request message on said second random-access control channel by one said mobile radio station, which data transfer request message will not result in a normal circuit-switched connection establishment and has a duration which is substantially shorter than a maximum allowed message duration;

a receiver for receiving a timing advance value corresponding to a distance between said one mobile station and the respective base station and determined by the respective base station on the basis of said data transfer request message;

controller responsive to said timing advance value for controlling the transmitter to send user data from said one mobile station to the respective base station on said second random-access control channel in data message having a duration which is substantially equal to said maximum allowed message duration, and to time sending the data message according to the determined timing advance value.

\* \* \* \* \*